United States Patent
Campagna et al.

(10) Patent No.: US 11,396,772 B2
(45) Date of Patent: Jul. 26, 2022

(54) OBSTACLE AND PULLING DETECTION IN A CLUTCH BASED ROLLER SHADE

(71) Applicant: Crestron Electronics, Inc., Rockleigh, NJ (US)

(72) Inventors: Michael Campagna, Woodcliff Lake, NJ (US); Benjamin Slivka, Hillsdale, NJ (US); Luis J. Rivera, Dumont, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 364 days.

(21) Appl. No.: 16/709,511

(22) Filed: Dec. 10, 2019

(65) Prior Publication Data

US 2021/0172249 A1   Jun. 10, 2021

(51) Int. Cl.
| | |
|---|---|
| *E06B 9/72* | (2006.01) |
| *E06B 9/42* | (2006.01) |
| *H02K 7/108* | (2006.01) |
| *H02K 11/24* | (2016.01) |
| *H02K 7/116* | (2006.01) |
| *E06B 9/68* | (2006.01) |

(52) U.S. Cl.
CPC .......... *E06B 9/72* (2013.01); *E06B 9/42* (2013.01); *H02K 7/108* (2013.01); *H02K 7/116* (2013.01); *H02K 11/24* (2016.01); *E06B 2009/6854* (2013.01); *H02K 2207/03* (2013.01)

(58) Field of Classification Search
CPC ...... E06B 9/72; E06B 9/42; E06B 2009/6854; E06B 2009/6836; E06B 2009/6809; E06B 2009/6818; E06B 9/68; H02K 11/24; H02K 7/08; H02K 7/116; H02K 2207/03
USPC ............................................................ 160/7
See application file for complete search history.

(56) References Cited

U.S. PATENT DOCUMENTS

| | | | |
|---|---|---|---|
| 7,729,807 B2 | 6/2010 | Guillemot et al. | |
| 8,947,027 B2 | 2/2015 | Mullet et al. | |
| 9,018,868 B2 | 4/2015 | Lucas et al. | |
| 9,152,032 B2 | 10/2015 | Mullet et al. | |
| 9,376,862 B2 | 6/2016 | Mullet et al. | |
| 9,394,743 B2 | 7/2016 | Mullet et al. | |
| 9,611,690 B2 | 4/2017 | Mullet et al. | |
| 9,670,724 B2 | 6/2017 | Oakley | |

(Continued)

FOREIGN PATENT DOCUMENTS

| | | | | |
|---|---|---|---|---|
| DE | 4201971 A1 | * | 8/1993 | ............ E05F 15/603 |
| EP | 3567206 A1 | * | 11/2019 | ............... E06B 9/72 |

*Primary Examiner* — Beth A Stephan
(74) *Attorney, Agent, or Firm* — Crestron Electronics, Inc.

(57) ABSTRACT

A motorized shade comprising a roller tube, a shade material connected to the roller tube, and a motor drive unit operably connected to the roller tube. The motor drive unit comprises a motor adapted to create torque to rotate the roller tube to lower or raise the shade material and a force sensor positioned at a point along the motor drive unit that resists the torque created by the motor resulting in a reaction force that is detected by the force sensor. The motor drive unit further comprises a motor control module adapted to receive sensor readings from the force sensor and control the motor in response to detecting an abrupt change in the reaction force using the received sensor readings to enable shade control via pulling of the shade material as well as or alternatively obstacle detection to minimize damage to the roller shade and users.

24 Claims, 5 Drawing Sheets

(56) References Cited

U.S. PATENT DOCUMENTS

| | | |
|---|---|---|
| 2004/0031321 A1 | 2/2004 | Orsat |
| 2004/0239269 A1* | 12/2004 | Fitzgibbon ................ E06B 9/88 |
| | | 318/366 |
| 2008/0163685 A1 | 7/2008 | Lapierre |
| 2011/0048651 A1 | 3/2011 | Goth |
| 2014/0090787 A1 | 4/2014 | Colson et al. |
| 2014/0224437 A1* | 8/2014 | Colson ..................... E06B 9/72 |
| | | 160/311 |
| 2014/0290870 A1 | 10/2014 | Colson et al. |
| 2014/0352897 A1 | 12/2014 | Mullet et al. |
| 2015/0090409 A1 | 4/2015 | Mullet et al. |
| 2015/0107788 A1 | 4/2015 | Mullet et al. |
| 2015/0275574 A1* | 10/2015 | Derk, Jr. .................. E06B 9/72 |
| | | 160/1 |
| 2016/0017656 A1 | 1/2016 | Adreon |
| 2017/0275884 A1 | 9/2017 | Thompson et al. |
| 2017/0324908 A1 | 11/2017 | Gharabegian |
| 2018/0058143 A1* | 3/2018 | Selogy ..................... E06B 9/68 |
| 2018/0106105 A1* | 4/2018 | Anthony ................. H01H 19/46 |
| 2019/0024452 A1 | 1/2019 | Derk, Jr. et al. |
| 2019/0071877 A1 | 3/2019 | Prohaszka et al. |
| 2019/0100961 A1* | 4/2019 | Kutell ..................... E06B 9/50 |
| 2019/0301166 A1 | 10/2019 | Thompson et al. |

\* cited by examiner

OBSTACLE AND PULLING DETECTION IN A CLUTCH BASED ROLLER SHADE

BACKGROUND OF THE INVENTION

Technical Field

Aspects of the embodiments relate to motorized shades, and more particularly to systems, methods, and modes for a motorized clutch based roller shade that automatically detects force exerted on or released from the shade material to enable shade control via pulling of the shade material as well as or alternatively obstacle detection to minimize damage to the roller shade and users.

Background Art

Motorized roller shades provide a convenient one-touch control solution for screening windows, doors, or the like, to achieve privacy and thermal effects. Unlike a manually controlled roller shade systems, where the user walks up to the window and raises or lowers the roller shade using a cord, a wand, or by pulling on the shade material, motorized roller shades make it easy to raise or lower one or multiple roller shades with the touch of a button, or by programming them to automatically move at a specific time with no direct user interaction. A motorized roller shade typically includes a rectangular shade material attached at one end to a cylindrical rotating tube, called a roller tube, and at an opposite end to a hem bar. The shade material is wrapped around the roller tube. An electric motor, either mounted inside the roller tube or externally coupled to the roller tube, rotates the roller tube to unravel the shade material to cover a window.

Due to the automated nature of movement of motorized roller shades, a user may not realize when there is an obstruction. An obstruction may interfere with the shade material's movement and may cause the shade material to bunch up. Damage may further occur to the shade material, the motor, or hardware, if the shade material drapery gets caught and pulled by the obstruction during lowering or raising of the shade material. In clutchless roller shades, which rely on counterbalancing or motor braking techniques to prevent the motor from rotating during rest, obstacles may be detected by the motor controller when the shade material is being lowered using current sensors, such as Hall effect sensors, which detect changes in current draw by the motor when shade material is pulled or encounters an obstacle. However, in clutch based roller shades, current sensors that measure current into the motor are not capable of detecting obstacles when the shade material is in the process of being lowered. This is due to the clutch insulating any external torque from feeding back into the motor when the shade material is being lowered.

Accordingly, a need has arisen for systems, methods, and modes for a motorized clutch based roller shade that automatically detects force exerted on or released from the shade material to enable shade control via pulling of the shade material as well as or alternatively obstacle detection to minimize damage to the roller shade and users.

SUMMARY OF THE INVENTION

It is an object of the embodiments to substantially solve at least the problems and/or disadvantages discussed above, and to provide at least one or more of the advantages described below.

It is an aspect of the embodiments to provide systems, methods, and modes for a motorized clutch based roller shade that automatically detects force exerted on or released from the shade material to enable shade control via pulling of the shade material.

It is also an aspect of the embodiment to provide systems, methods, and modes for a motorized clutch based roller shade that automatically detects force exerted on or released from the shade material to enable obstacle detection to minimize damage to the roller shade and users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments, a motorized shade is provided for covering an architectural opening comprising a roller tube, a shade material comprising and extending between a first end connected to the roller tube and a second end, and a motor drive unit operably connected to the roller tube. The motor drive unit comprises a motor adapted to create torque to rotate the roller tube to lower or raise the shade material, a force sensor positioned at a point along the motor drive unit that resists the torque created by the motor resulting in a reaction force that is detected by the force sensor, and a motor control module electrically connected to the motor and the force sensor, wherein the motor control module is adapted to receive sensor readings from the force sensor and control the motor in response to detecting an abrupt change in the reaction force using the received sensor readings.

According to an embodiment, the motor control module detects the abrupt change in the reaction force when external force is exerted on or released from the shade material. The motor control module may detect the abrupt change in the reaction force when the shade material is pulled causing the motor control module to detect that there is an abrupt increase in the reaction force. When the motor is stationary and the motor control module detects that the shade material has been pulled, the motor control module may command the motor to rotate to raise or lower the shade material. According to an embodiment, the motor control module is adapted to detect a single pull and a double pull on the shade material, wherein the motor control module commands the motor to raise the shade material in response to detecting a single pull and lower the shade material in response to detecting a double pull or vice versa. When the motor is in the process of lowering or raising the shade material and the motor control module detects that the shade material has been pulled, the motor control module may command the motor to stop.

According to another embodiment, the motorized shade further comprises a hem bar connected to the second end of the shade material, wherein the motor control module detects the abrupt change in the reaction force when external force is exerted on or released from the hem bar. The motor control module may detect the abrupt change in the reaction force when the hem bar is pulled. When the motor is stationary and the motor control module detects that the hem bar has been pulled, the motor control module may command the motor to rotate to raise or lower the shade material. According to another embodiment, when the motor is in the process of lowering or raising the shade material and the motor control module detects that the hem bar has been pulled, the motor control module commands the motor to stop.

According to another embodiment, the motor control module may detect the abrupt change in the reaction force when the hem bar is unweight as a result of encountering an obstacle causing the motor control module to detect that there is an abrupt release in the reaction force. When the motor is in the process of lowering the shade material and the motor control module detects that the hem bar has encountered an obstacle, the motor control module may command the motor to stop.

According to an embodiment, the force sensor may comprise a force sensing film resistor, an electric pressure sensor, a mechanical pressure sensor, a force actuator, a force transducer, a strain gauge, or the like, and any combinations thereof. According to an embodiment, the force sensor is placed between two engaging planar surfaces within the motor drive unit that are substantially normal to a direction of the torque created by the motor.

According to an embodiment, the motor drive unit further comprises a stationary motor housing adapted to enclose the motor, the force sensor, and the motor control module therein, wherein the motor housing comprises a retaining surface adapted to resist the torque created by the motor, wherein the force sensor is positioned in proximity to the retaining surface. According to an embodiment, the motor drive unit further comprises a drive wheel adapted to engage the roller tube and a motor drivetrain between the motor and the drive wheel through which the motor rotates the drive wheel, wherein the motor drivetrain comprises a retaining member adapted to engage the retaining surface of the motor housing to retain the motor drivetrain within the housing, wherein the force sensor is positioned between the retaining member and the retaining surface. The motor drivetrain may comprise at least one selected from the group consisting of a planetary gear, a clutch, or the like, and any combinations thereof.

According to an embodiment, the motor drive unit comprises a stationary motor head connected to the motor housing and adapted to be connected to the architectural opening, wherein the motor head comprises a retaining member adapted to engage the retaining surface of the motor housing to connect the motor head to the motor housing, wherein the force sensor is installed between the retaining member and the retaining surface.

According to an embodiment, the motor control module is adapted to determine a baseline torque curve using the received sensor readings, and wherein the motor control module detects the abrupt change in the reaction force when a sensor reading received from the force sensor deviates from the baseline torque curve. According to another embodiment, the motor control module is adapted to store a minimum threshold change, and wherein the motor control module detects the abrupt change in the reaction force when a sensor reading received from the force sensor is below the minimum threshold change. According to yet another embodiment, the motor control module is adapted to store a maximum threshold change, and wherein the motor control module detects the abrupt change in the reaction force when a sensor reading received from the force sensor is above the maximum threshold change.

According to another aspect of the embodiments, a motorized shade is provided for covering an architectural opening comprising a roller tube, a shade material comprising and extending between a first end connected to the roller tube and a second end, and a motor drive unit operably connected to the roller tube. The motor drive unit comprises a motor adapted to create torque to rotate the roller tube to lower or raise the shade material, a force sensor positioned at a point along the motor drive unit that resists the torque created by the motor resulting in a reaction force that is detected by the force sensor, and a motor control module electrically connected to the motor and the force sensor, wherein the motor control module is adapted to receive sensor readings from the force sensor, and wherein the motor control module is adapted to control the motor in response to determining that the shade material has been pulled when the motor control module detects that there is an abrupt increase in the reaction force using the received sensor readings.

According to a further aspect of the embodiments, a motorized shade is provided for covering an architectural opening comprising a roller tube, a shade material comprising and extending between a first end connected to the roller tube and a second end, a hem bar connected to the second end of the shade material, and a motor drive unit operably connected to the roller tube. The motor drive unit comprises a motor adapted to create torque to rotate the roller tube to lower or raise the shade material, a force sensor positioned at a point along the motor drive unit that resists the torque created by the motor resulting in a reaction force that is detected by the force sensor, and a motor control module electrically connected to the motor and the force sensor, wherein the motor control module is adapted to receive sensor readings from the force sensor, and wherein the motor control module is adapted to control the motor in response to determining that the hem bar has encountered an obstacle when the motor control module detects that there is an abrupt release in the reaction force using the received sensor readings.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
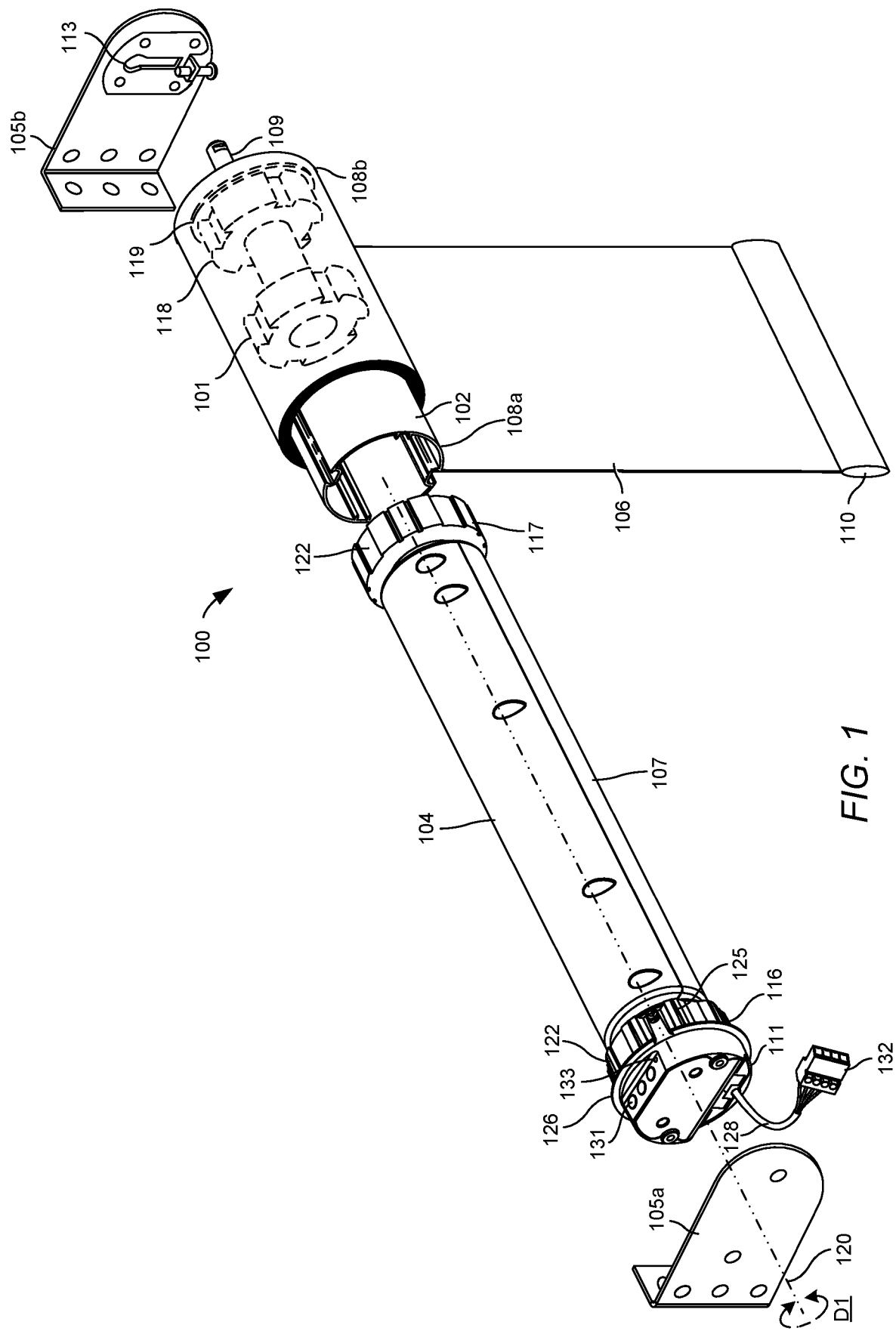

FIG. 1 illustrates a front perspective view of a roller shade according to one embodiment.

Figure 2:
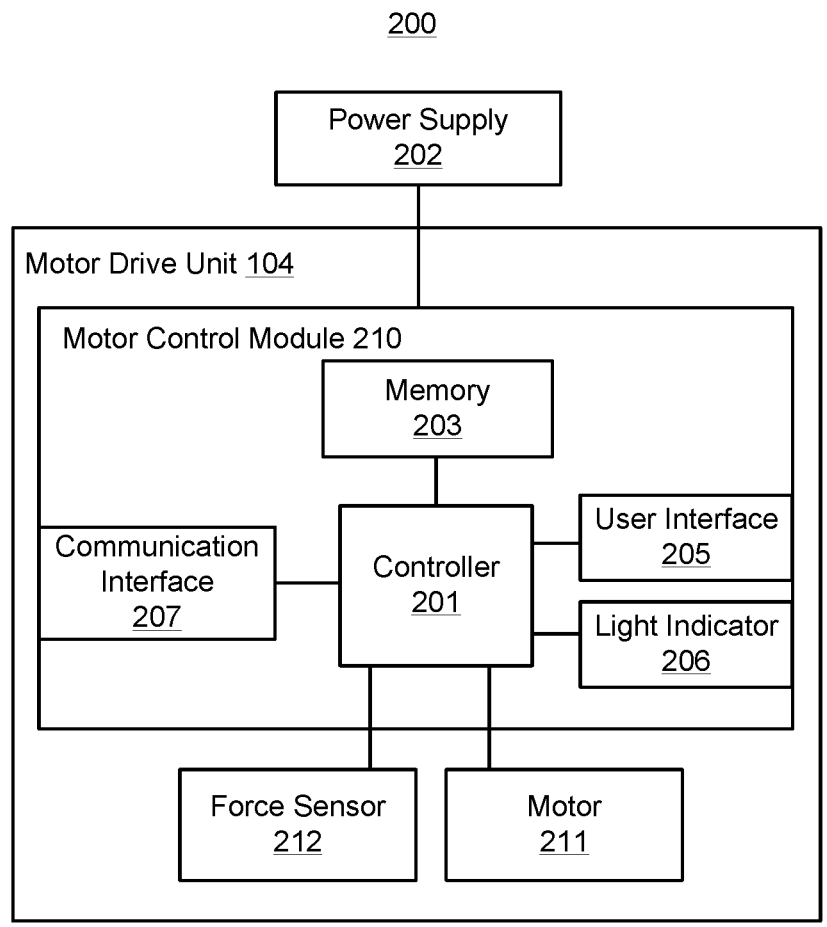

FIG. 2 illustrates a block diagram of the motor drive unit according to one embodiment.

Figure 3A:
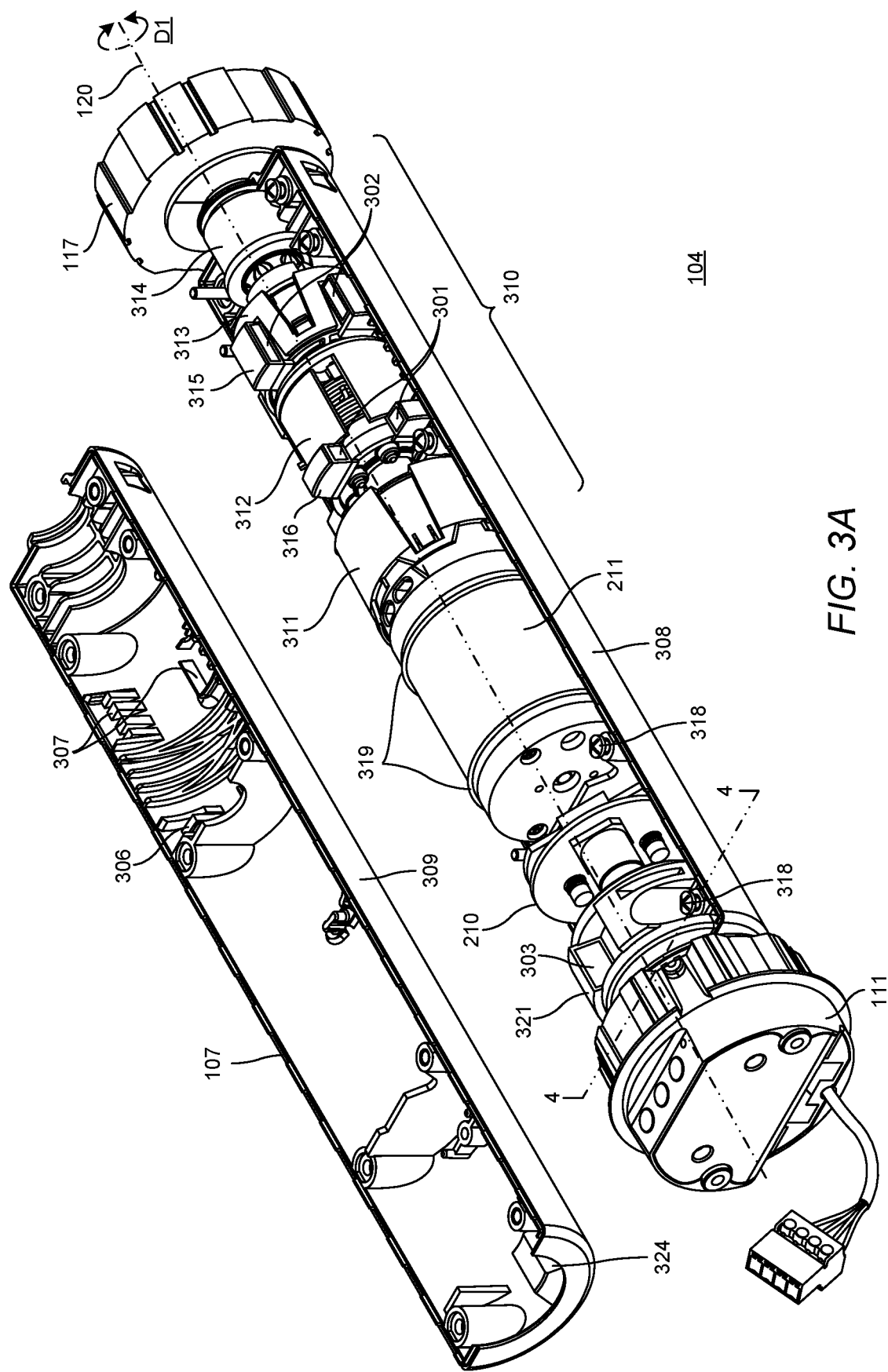

FIG. 3A illustrates a perspective view of the motor drive unit with the motor housing partially removed according to one embodiment.

Figure 3B:
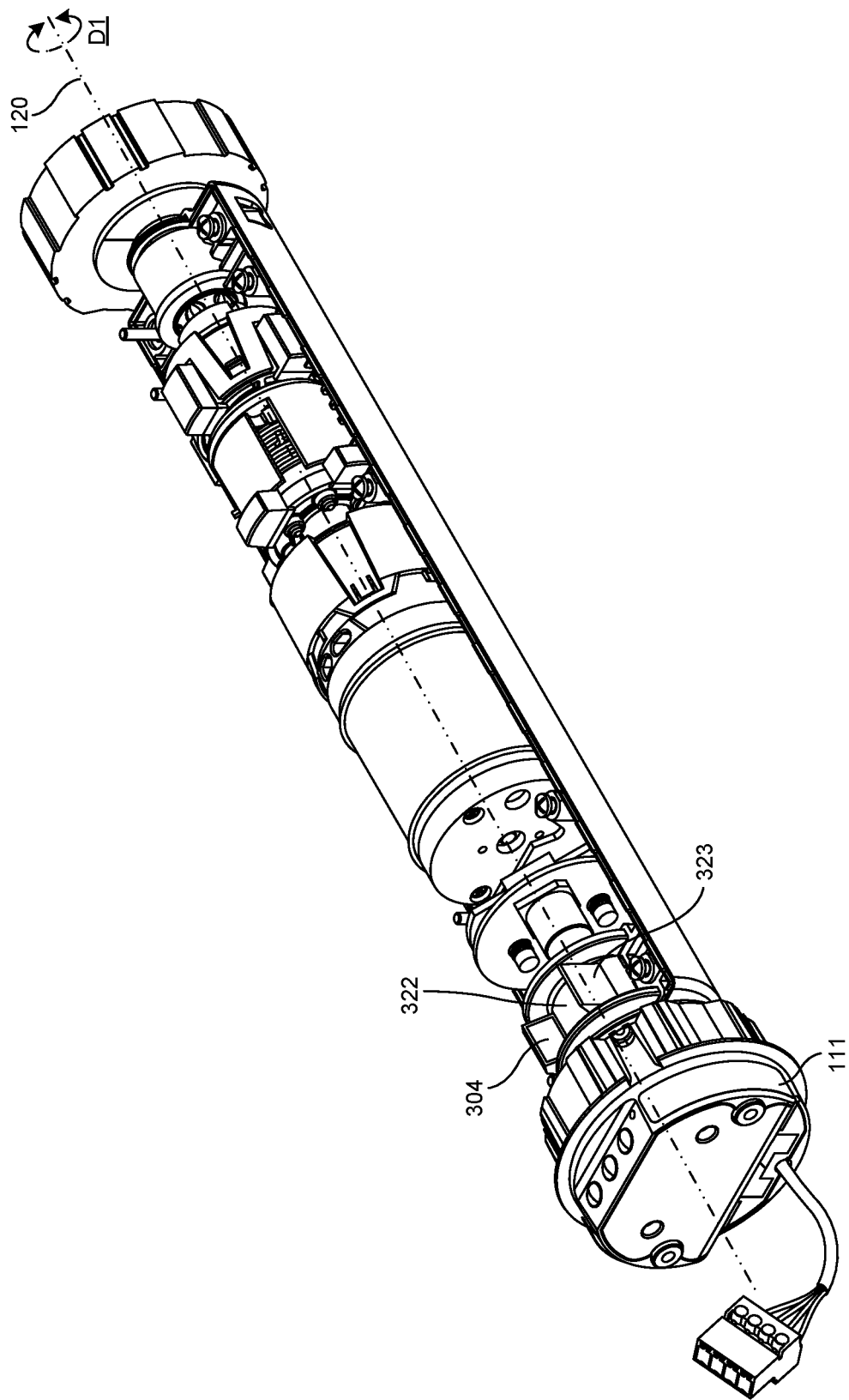

FIG. 3B illustrates a perspective view of the motor drive unit of FIG. 3B but with a rubber isolator removed according to one embodiment.

Figure 4:
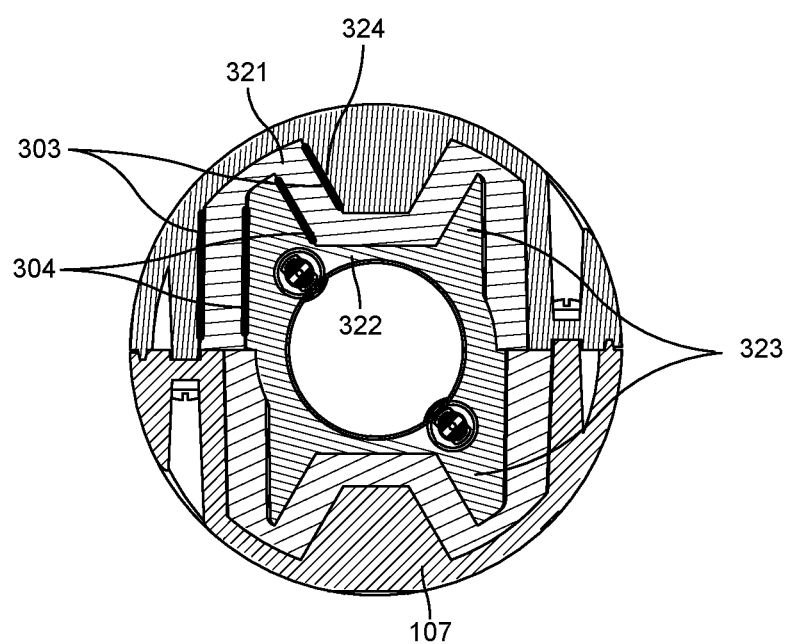

FIG. 4 illustrates a cross sectional view of the motor drive unit taken along line 4-4 in FIG. 3A according to one embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as roller shades.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
100 Roller Shade
101 Idler Assembly
102 Roller Tube
104 Motor drive Unit
105a Mounting Bracket
105b Mounting Bracket
106 Shade Material
107 Motor Housing
108a First End
108b Second End
109 Idler Pin
110 Hem Bar
111 Motor Head
113 Keyhole
116 Crown Adapter Wheel
117 Drive Wheel
118 Idler Body
119 Flange
120 Longitudinal Axis
122 Channels
125 Teeth
126 Flange
128 Power Cord
131 Three-Button Interface
132 Terminal Block
133 LED Indicator
200 Block Diagram
201 Controller
202 Power Supply
203 Memory
205 User Interface
206 Light Indicator
207 Communication Interface
210 Motor Control Module
211 Motor
212 Force Sensor
301 Force Sensor
302 Force Sensor
303 Force Sensor
304 Force Sensor
306 Clutch Retaining Surface(s)
307 Planetary Gear Retaining Surfaces(s)
308 First Longitudinal Motor Housing Portion
309 Second Longitudinal Motor Housing Portion
310 Motor Drivetrain
311 First Stage Planetary Gear
312 Clutch
313 Final Stage Planetary Gear
314 Output Mandrel
315 Planetary Gear Retaining Members
316 Clutch Regaining Members
318 Screws
319 Motor Retaining Rings
321 Rubber Isolator
322 Barrel
323 Motor Head Retaining Members
324 Motor Head Regaining Surfaces(s)

LIST OF ACRONYMS USED IN THE SPECIFICATION IN ALPHABETICAL ORDER

The following is a list of the acronyms used in the specification in alphabetical order.
ASIC Application Specific Integrated Circuit
BLDC Brushless Direct Current
CATS Category 5 Cable
D1 Direction
IR Infrared
LAN Local Area Network
LED Light Emitting Diode
PCB Printed Circuit Board
PoE Power over Ethernet
RAM Random-Access Memory
RF Radio Frequency
ROM Read-Only Memory

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, N.J.

The different aspects of the embodiments described herein pertain to the context of motorized shades, but is not limited thereto, except as may be set forth expressly in the appended claims. While a motorized shade is described herein for covering a window, the motorized shade may be used to cover any architectural opening, such as doors, wall openings, or the like. Additionally, while the embodiments described herein reference roller shades, the embodiments described herein may be adapted in other types of window, door, or wall opening coverings, such as inverted rollers, Roman shades, Austrian shades, pleated shades, blinds, shutters, skylight shades, garage doors, or the like.

Disclosed herein are systems, methods, and modes for a motorized clutch based roller shade that automatically detects changes in force exerted on or released from the shade material. This enables the roller shade to be controlled to lower or raise the shade material via pulling or tugging on the shade material or the hem bar. In addition, this enables the roller shade to automatically detect obstacles during movement of the shade material to minimize damage to the roller shade and users.

Referring to FIG. 1, there is shown a front perspective view of a roller shade 100 according to one aspect of the embodiments. Roller shade 100 generally comprises a roller tube 102, a motor drive unit 104, an idler assembly 101, shade material 106, and a hem bar 110. Shade material 106 is connected at its top end to the roller tube 102 and at its bottom end to the hem bar 110. Hem bar 110 can comprise a weighted bar that runs longitudinally and laterally across the width of the shade material 106 to minimizes any movement in the field and properly tensions the shade material 106 to allow for a straight hang of the shade material 106. Shade material 106 wraps around the roller tube 102 and is unraveled from the roller tube 102 to cover a window, a door, a wall opening, or the like.

Roller tube 102 is generally cylindrical in shape and longitudinally and laterally extends from a first end 108a to a second end 108b. In various embodiments, the roller tube 102 comprises electrically conductive material such as aluminum, stainless steel, or other electrically conductive materials known to those skilled in the art. The first end 108a of the roller tube 102 receives the motor drive unit 104 and the second end 108b of the roller tube 102 receives the idler assembly 101.

The idler assembly 101 of the roller shade 100 may comprise an idler pin 109 and an idler body 118 rotatably connected about the idler pin 109. The idler body 118 is inserted into and operably connected to the roller tube 102 such that rotation of the roller tube 102 also rotates the idler body 118. The idler body 118 may comprise a flange 119 to prevent the idler body 118 from sliding entirely into the roller tube 102. The idler body 118 may comprise ball bearings therein (not shown) allowing the idler body 118, and thereby the roller tube 102, rotate with respect to the idler pin 109.

The motor drive unit 104 may comprise a motor head 111, a crown adapter wheel 116, a motor housing 107, a motor control module 210 and a motor 211 therein (FIGS. 2 and 3A), and a drive wheel 117. The motor drive unit 104 may be inserted into first end 108a of the roller tube 102. The crown adapter wheel 116 and the drive wheel 117 are generally cylindrical in shape and are inserted into and operably connected to roller tube 102 through its first end 108a. Crown adapter wheel 116 and drive wheel 117 may comprise a plurality of channels 122 extending circumferentially about their external surfaces that mate with complementary projections radially extending from the inner surface of the roller tube 102 to lock their respective rotation. Crown adapter wheel 116 can further comprise a plurality of teeth 125 extending circumferentially about its external surface to form a friction fit between the crown adapter wheel 116 and the inner surface of the roller tube 102. The crown adapter wheel 116 may be rotatably attached to a first end of the motor housing 107 via a ball bearing therein (not shown). Crown adapter wheel 116 can further comprise a flange 126 radially extending therefrom to prevent it from sliding entirely into the roller tube 102 such that the motor head 111 remains at least partially exterior to the roller tube 102. The drive wheel 117 is operably connected either directly or indirectly through a motor drivetrain 310 (FIG. 3A) to the output shaft of the motor 211, such that rotation of the motor output shaft also rotates the drive wheel 117.

During installation, the roller shade 100 is mounted on or in a window between the first and second mounting brackets 105a and 105b. The roller shade 100 may first be mounted to the second mounting bracket 105b by inserting the tip of the idler pin 109 into a keyhole 113 of the second mounting bracket 105b. The roller shade 100 may then be mounted to the first mounting bracket 105a by snapping the motor head 111 of the motor drive unit 104 to the first mounting bracket 105a or coupling the motor head 111 to the first mounting bracket 105a using screws. The mounting brackets 105a and 105b can comprise similar configuration to the CSS-DE-COR3 QMT®3 Series Décor Shade Hardware, available from Crestron Electronics, Inc. of Rockleigh, N.J. Other types of brackets may be utilized without departing from the scope of the present embodiments.

In operation, the shade material 106 is rolled down and rolled up between an upper limit and a lower limit via the motor drive unit 104. Particularly, the motor 211 drives the drive wheel 117, which in turn engages and rotates the roller tube 102 about longitudinal axis 120. The roller tube 102, in turn, engages and rotates the crown adapter wheel 116 about longitudinal axis 120 with respect to the motor 211, while the motor housing 107, including the motor 211 and motor control module 210, remain stationary. As a result, the shade material 106 may be lowered from an upper limit where it is at an opened or rolled up position and substantially fully wrapped about the roller tube 102, to a lower limit where it is at a closed or rolled down position and substantially unraveled from the roller tube 102, and vice versa.

FIG. 2 is an illustrative block diagram 200 of the motor drive unit 104 according to one embodiment. The motor drive unit 104 may comprise the motor 211 and a motor control module 210. The motor control module 210 operates to control the motor 211, directing the operation of the motor, including its direction, speed, and position. The motor control module 210 may comprise fully integrated electronics printed on a printed circuit board (PCB). The motor control module 210 can comprise a controller 201, memory 203, communication interface 207, user interface 205, and light indicator 206. Power supply 202 can provide power to the circuitry of the motor control module 210 and in turn the motor 211. Power can be supplied to the motor control module 210 through a power cord 128 by connecting a terminal block 132 (FIG. 1) to a dedicated power supply 202, such as the CSA-PWS40 or CSA-PWS10S-HUBENET power supplies, available from Crestron Electronics, Inc. of Rockleigh, N.J. In another embodiment, the motor drive unit 104 may be battery operated and as such may be connected to an internal or external power supply 202 in a form of batteries. In yet another embodiment, the motor drive unit 104 may be powered via solar panels placed in proximity to the window to aggregate solar energy.

Controller 201 can represent one or more microprocessors, and the microprocessors can be "general purpose" microprocessors, a combination of general and special purpose microprocessors, or application specific integrated circuits (ASICs). Controller 201 can provide processing capability to provide processing for one or more of the techniques and functions described herein. Memory 203 can be communicably coupled to controller 201 and can store data and executable code. In another embodiment, memory 203 is integrated into the controller 201. Memory 203 can represent volatile memory such as random-access memory (RAM), but can also include nonvolatile memory, such as read-only memory (ROM) or Flash memory.

Motor control module 210 may further comprise a communication interface 207, such as a wired or a wireless communication interface, configured for receiving control commands from an external control point. The wireless interface may be configured for bidirectional wireless communication with other electronic devices over a wireless network. In various embodiments, the wireless interface 210 can comprise a radio frequency (RF) transceiver, an infrared (IR) transceiver, or other communication technologies known to those skilled in the art. In one embodiment, the wireless interface 210 communicates using the infiNET EX® protocol from Crestron Electronics, Inc. of Rockleigh, N.J. infiNET EX® is a reliable and affordable protocol that employs steadfast two-way RF communications throughout a residential or commercial structure without the need for physical control wiring. infiNET EX® utilizes 16 channels on an embedded 2.4 GHz mesh network topology, allowing each infiNET EX® device to function as an expander, passing command signals through to every other infiNET EX® device within range (approximately 150 feet or 46 meters indoors), ensuring that every command reaches its intended destination without disruption. In another embodiment, communication is employed using the ZigBee® protocol from ZigBee Alliance. In yet another embodiment, wireless communication interface 207 may communicate via Bluetooth transmission. A wired communication interface 207 may be configured for bidirectional communication with other devices over a wired network. The wired interface 210 can represent, for example, an Ethernet or a Cresnet® port. Cresnet® provides a network wiring solution for Crestron® keypads, lighting controls, thermostats, and other devices. The Cresnet® bus offers wiring and configuration, carrying bidirectional communication and 24 VDC power to each device over a simple 4-conductor cable. In various aspects of the embodiments, the communication interface 207 and/or power supply 202 can comprise a Power over Ethernet (PoE) interface by which the controller 201 can receive both electric power signal and control input from a network. For example, the PoE interface may be connected through category 5 cable (CAT5) to a local area network (LAN) which contains both a power supply and multiple control points and signal generators. Additionally, through the PoE interface, the controller 201 may interface with the internet and receive control inputs remotely, such as from a homeowner running an application on a smart phone.

Motor control module 210 can further comprise a local user interface 205, such as a three button interface 131 disposed on the motor head 111 (FIG. 1), that allows users to configure the motor drive unit 104, for example to set the shade upper and lower limits. Furthermore, the motor control module 210 may comprise a light indicator 206, such as a multicolor light emitting diode (LED) 133 disposed on the motor head 111 (FIG. 1), for indicating the motor status.

The motor drive unit 104 further comprises a force sensor 212 in communication with the controller 201 adapted to detect abrupt changes in the torque driven off the motor 211. Using the readings of the force sensor 212, the controller 201 can automatically detect changes in force exerted on or released from the shade material 106 to enable shade control via pulling of the shade material 106 as well as obstacle detection to minimize damage to the roller shade and users, as further discussed below. According to an embodiment, force sensor 212 may comprise a force sensing film resistor comprising two sets of contacts applied on a resistive film. When force is applied on such force sensors, conductivity is increased between the two sets of contacts resulting in detection of force. According to other embodiments, the force sensor 212 may comprise any other force sensor adapted to detect pressure, such as an electric pressure sensor, a mechanical pressure sensor, a force actuator, a force transducer, a strain gauge, or the like.

The control commands received by the controller 201 may be a direct user input to the controller 201 from the user interface 205, through a pull or a tug of the shade material 106 as further discussed below, or through a wired or wireless signal received by the communication interface 207 from an external control point. For example, the controller 201 may receive a control command from a wall-mounted button panel or a touch-panel in response to a button actuation or similar action by the user. Control commands may also originate from a signal generator such as a timer or external sensors, such as occupancy sensors. Accordingly, the motor control module 210 can integrate seamlessly with other control systems using the communication interface 207 to be operated from keypads, wireless remotes, touch screens, and wireless communication devices, such as smart phones. Additionally, the motor control module 210 can be integrated within a large scale building automation system or a small scale home automation system and be controllable by a central control processor, such as the PRO3 control processor available from Crestron Electronics, Inc., that networks, manages, and controls a building management system.

Referring to FIGS. 3A and 3B, there are shown perspective views of the motor drive unit 104 with the motor housing 107 partially removed. The motor drive unit 104 includes a motor housing 107 that houses the motor control module 210 and the motor 211. The motor housing 107 may be separable along its length comprising a first longitudinal portion 308 and a second longitudinal portion 309 adapted to be interconnected via screws 318. According to an embodiment, the motor 211 is suspended in the motor housing 107 using a pair of rubber rings 319. This allows the motor 211 to be retained by motor housing 107 and prevent its rotation during operation. According to an embodiment, the motor 211 may comprise a brushless direct current (BLDC) electric motor, although other motors known in the art can be implemented.

The motor 211 may drive the drive wheel 117 through a motor drivetrain 310 residing within motor housing 107 and connected to the output shaft (not shown) of the motor 211. The motor drivetrain 310 may include a series of components that in combination provide efficiency in the operation of the motor 211. Particularly, between the motor 211 and the drive wheel 117, the motor drivetrain 310 may comprise a first stage planetary gear 311, a clutch 312, a final stage planetary gear 313, and an output mandrel 314 connected to the drive wheel 117. In operation, the output shaft of the motor 211 drives into the first stage planetary gear 311, which in turn drives into an input stage of the clutch 312, which drives into an input stage of the final stage planetary gear 313, which drives the output mandrel 314, which in turn drives the drive wheel 117.

Each planetary gear 311 and 313 may comprise a plurality of planet gears, which are driven by and rotate about a sun gear within a stationary ring gear as is known in the art. In one embodiment, the first and final stage planetary gears 311 and 313 may be configured for providing speed reduction and torque increase to achieve efficient operation of the motor 211. According to another embodiment, the first and final stage planetary gears 311 and 313 may be configured for providing increased speed and decreased torque. According to various aspects of the embodiment, the motor drive unit 104 may comprise less, additional, or no planetary gears.

The clutch 312 may comprise an input portion and an output portion rotationally positioned about a stationary barrel and which cooperate to loosen or tighten one or more torsion springs with respect to the stationary barrel as is known in the art. The clutch 312 allows torque to translate from the output shaft of the motor 211 to the drive wheel 117, but prevents any torque exerted on the drive wheel 117 as a result of a load to be translated through the clutch 312 back to the motor 211. Such load may include the weight of the shade material 106, the weight of the hem bar 110, pulling or tugging on the shade material 106 or the hem bar 110, or when the hem bar 110 or the shade material 106 have encountered an obstacle. Additionally, when the motor 211 stops, the clutch 312 holds the position of the roller shade 100, allowing the motor 211 to shut down and not exert any power to hold the shade material 106 in place.

According to an embodiment, force sensor 212 may comprise one or a plurality of force sensing film resistors 301, 302, 303 (FIG. 3A), and 304 (FIG. 3B). Force sensors 301-304 are positioned on or within the motor drive unit 104 such that they can detect changes in the torque driven off of the motor 211 that creates a reaction force in rotational direction D1 about the longitudinal axis 120 at reaction constraint points that resist the torque. In other words, force sensors 301-303 are placed at points along the motor drive unit 104 that resist the motion that is created by the motor 211, for example that prevent the motor 211 and/or motor housing 107 from rotating while the motor 211 is in operation.

According to an embodiment, each force sensor 301-304 may be placed between two engaging planar surfaces that are substantially normal to the direction D1 of the reaction force to detect changes in the torque driven off of the motor 211. Particularly, the motor 211 and the motor drivetrain 310, including planetary gears 311, 313, and clutch 312, are restrained within the motor housing 107 such that their stationary parts are not rotated. For example, as shown in FIG. 3A, the final stage planetary gear 313 may be retained within the motor housing 107 by planetary gear retaining members 315 that engage planetary gear retaining surfaces 307 within the motor housing 107. Similarly, the clutch 312 is retained within the motor housing 107 by retaining members 316 that engage clutch retaining surfaces 306 within the motor housing 107. As a result, a reaction force is created between the points that hold the torque along the motor drive unit 104 between the motor drivetrain components 310 and any supports to any of the drivetrain components 310 within motor housing 107. For example, such points may include between the clutch retaining members 316 and the clutch retaining surfaces 306 in the motor housing 107 and between the planetary gear retaining members 315 of the final stage planetary gear 313 and the planetary gear retaining surfaces 307 in the motor housing 107. As a result, a first set of force sensors 301 may be placed between the clutch retaining members 316 and the clutch retaining surfaces 306 in the motor housing 107. A second set of force sensors 302 may be placed between the retaining members 315 of the final stage planetary gear 313 and the planetary gear retaining surfaces 307 in the motor housing 107. Although, in other roller shade constructions, the reaction force may be created along other points of the motor drive unit 104.

In addition, the reaction force may be created between the housing 107 and the motor head 111, which is held stationary by the mounting bracket 105*a*. Referring to FIGS. 3A, 3B, and 4, where FIG. 4 shows a cross sectional view of the motor drive unit 104 taken along line 4-4 in FIG. 3A. The motor head 111 may comprise a stationary barrel 322 that may be retained within the motor housing 107 by retaining members 323 to connect the motor head 111 to the motor housing 107. As a result, a reaction force is created between the points that hold the torque along the motor drive unit 104 between the housing 107 and the motor head 111, including between the motor head retaining members 323 and motor head retaining surfaces 324 of the motor housing 107. The motor head 111 may further comprise a rubber isolator 321 that surrounds the stationary barrel 322 and which biases the stationary barrel 322 within the motor housing 107. According to an embodiment, force sensors 303 and 304 may be placed between the motor head retaining members 323 and motor head retaining surfaces 324 of the motor housing 107—on either side or on both sides of the rubber isolator 321 as shown in FIG. 4.

Force sensors 301-304 may be electrically connected to the motor control module 210 to transmit sensor readings to the controller 201. The controller 201 may monitor the received sensor readings from one or the plurality of force sensors 301-303 and determine abrupt changes in the reaction force on the force sensors 301-303. Using the force sensors 301-303 on a location of the motor 211 that acts as a support to the driven torque allows the controller 201 to directly correlate the measured force to the corresponding torque. Particularly, when in operation, the motor torque varies along a baseline torque curve. The controller 201 may monitor the sensor readings from the force sensors 301-304 and determine this baseline torque curve. The controller 201 may detect abrupt changes in the reaction force when the measured force deviates from this predicted path by determining that a receive sensor reading deviates from the monitored baseline torque curve, for example by predetermined some value. According to another embodiment, the controller 201 may store a minimum threshold change versus time and it may detect an abrupt change in the reaction force when a received sensor reading is below the minimum threshold change. Similarly, the controller may store a maximum threshold change versus time and it may detect an abrupt change in the reaction force when a sensor reading is above the maximum threshold change. The controller 201 may use the detected abrupt changes in the reaction force for various applications.

For example, for obstacle detection application, the controller 201 may monitor the received sensor readings when the shade material 106 is in motion and upon detecting abrupt changes in the reaction force stop the motor 211 from lowering or raising the shade material 106. If the shade material 106 is in the process of being lowered and hits an obstacle, this will unweight the hem bar 110 causing the controller 201 to detect that there is an abrupt release in the reaction force and in response stop the motor 211. This prevents the shade material 106 from being unraveled further from the roller tube 102 and from being damaged and potentially misaligned with respect to the roller tube 102. If the shade material 106 is in the process of being raised and is caught by an object that pulls on the shade material 106 or the hem bar 110 as it continues being raised, the controller 201 may detect that there is an abrupt increase in the reaction force and stop the motor 211 to prevent the shade material 106 from being further pulled and ripped. According to a further embodiment, when lowering the shade material 106, after stopping the motor 211, the controller 201 may direct the motor 211 to raise the shade material 106 by a predetermined distance.

According to another embodiment, the controller 201 may use the sensor readings to control the operation of the roller shade 100. For example, when the motor 211 and thereby the shade material 106 is stationary, the controller 201 may be adopted to detect whether the shade material 106 has been pulled or tugged by a user by detecting abrupt changes in the reaction force and in response direct the motor 211 to lower or raise the shade material 106. For example, a single pull may indicate to the controller 201 to lower the shade material 106 and a double pull may indicate to the controller 201 to raise the shade material 106, or vice versa. Similarly, when the motor 211 is being operated to raise or lower the shade material 106, the controller 201 may be adopted to detect whether the shade material 106 has been pulled or tugged by a user by detecting abrupt changes in the reaction force and in response direct the motor 211 to stop lowering or raising the shade material 106.

INDUSTRIAL APPLICABILITY

To solve the aforementioned problems, the aspects of the embodiments are directed towards systems, methods, and modes for a motorized clutch based roller shade that automatically detects force exerted on or released from the shade material to enable shade control via pulling of the shade material as well as obstacle detection to minimize damage to the roller shade and users. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments. In various embodiments, the motorized shade described herein may be used to cover a window, a door, a wall opening, or the like. In addition, the embodiments described herein may be adapted in varies types of window or door coverings, such as roller shades, inverted rollers, Roman shades, Austrian shades, pleated shades, blinds, shutters, skylight shades, garage doors, or the like.

What is claimed is:

1. A motorized shade for covering an architectural opening comprising:
    a roller tube;
    a shade material comprising and extending between a first end connected to the roller tube and a second end; and
    a motor drive unit operably connected to the roller tube and comprising:
        a motor adapted to create torque to rotate the roller tube to lower or raise the shade material;
        a force sensor positioned at a point along the motor drive unit that resists the torque created by the motor resulting in a reaction force that is detected by the force sensor; and
        a motor control module electrically connected to the motor and the force sensor, wherein the motor control module is adapted to receive sensor readings from the force sensor and control the motor in response to detecting an abrupt change in the reaction force using the received sensor readings.

2. The motorized shade of claim 1, wherein the motor control module detects the abrupt change in the reaction force when external force is exerted on or released from the shade material.

3. The motorized shade of claim 1, wherein the motor control module detects the abrupt change in the reaction force when the shade material is pulled causing the motor control module to detect that there is an abrupt increase in the reaction force.

4. The motorized shade of claim 3, wherein when the motor is stationary and the motor control module detects that the shade material has been pulled, the motor control module commands the motor to rotate to raise or lower the shade material.

5. The motorized shade of claim 4, wherein the motor control module is adapted to detect a single pull and a double pull on the shade material, wherein the motor control module commands the motor to raise the shade material in response to detecting a single pull and lower the shade material in response to detecting a double pull or vice versa.

6. The motorized shade of claim 3, wherein when the motor is in the process of lowering or raising the shade material and the motor control module detects that the shade material has been pulled, the motor control module commands the motor to stop.

7. The motorized shade of claim 1 further comprising a hem bar connected to the second end of the shade material, wherein the motor control module detects the abrupt change in the reaction force when external force is exerted on or released from the hem bar.

8. The motorized shade of claim 7, wherein the motor control module detects the abrupt change in the reaction force when the hem bar is pulled.

9. The motorized shade of claim 8, wherein when the motor is stationary and the motor control module detects that the hem bar has been pulled, the motor control module commands the motor to rotate to raise or lower the shade material.

10. The motorized shade of claim 8, wherein when the motor is in the process of lowering or raising the shade material and the motor control module detects that the hem bar has been pulled, the motor control module commands the motor to stop.

11. The motorized shade of claim 7, wherein the motor control module is adopted to detect the abrupt change in the reaction force when the hem bar encounters an obstacle causing the motor control module to detect that there is an abrupt release in the reaction force.

12. The motorized shade of claim 11, wherein when the motor is in the process of lowering the shade material and the motor control module detects that the hem bar has encountered an obstacle, the motor control module commands the motor to stop.

13. The motorized shade of claim 1, wherein the force sensor comprise a force sensing film resistor.

14. The motorized shade of claim 1, wherein the force sensor is selected from the group consisting of an electric pressure sensor, a mechanical pressure sensor, a force actuator, a force transducer, a strain gauge, and any combinations thereof.

15. The motorized shade of claim 1, wherein the force sensor is placed between two engaging planar surfaces within the motor drive unit that are substantially normal to a direction of the torque created by the motor.

16. The motorized shade of claim 1, wherein the motor drive unit further comprises a stationary motor housing adapted to enclose the motor, the force sensor, and the motor control module therein, wherein the motor housing comprises a retaining surface adapted to resist the torque created by the motor, wherein the force sensor is positioned in proximity to the retaining surface.

17. The motorized shade of claim 16, wherein the motor drive unit further comprises a drive wheel adapted to engage the roller tube and a motor drivetrain between the motor and the drive wheel through which the motor rotates the drive wheel, wherein the motor drivetrain comprises a retaining member adapted to engage the retaining surface of the motor housing to retain the motor drivetrain within the housing, wherein the force sensor is positioned between the retaining member and the retaining surface.

18. The motorized shade of claim 17, wherein the motor drivetrain comprises at least one selected from the group consisting of a planetary gear, a clutch, and any combinations thereof.

19. The motorized shade of claim 16, wherein the motor drive unit comprises a stationary motor head connected to the motor housing and adapted to be connected to the architectural opening, wherein the motor head comprises a retaining member adapted to engage the retaining surface of the motor housing to connect the motor head to the motor housing, wherein the force sensor is installed between the retaining member and the retaining surface.

20. The motorized shade of claim 1, wherein the motor control module is adapted to determine a baseline torque curve using the received sensor readings, and wherein the motor control module detects the abrupt change in the reaction force when a sensor reading received from the force sensor deviates from the baseline torque curve.

21. The motorized shade of claim 1, wherein the motor control module is adapted to store a minimum threshold change, and wherein the motor control module detects the abrupt change in the reaction force when a sensor reading received from the force sensor is below the minimum threshold change.

22. The motorized shade of claim 1, wherein the motor control module is adapted to store a maximum threshold change, and wherein the motor control module detects the abrupt change in the reaction force when a sensor reading received from the force sensor is above the maximum threshold change.

23. A motorized shade for covering an architectural opening comprising:
a roller tube;
a shade material comprising and extending between a first end connected to the roller tube and a second end; and
a motor drive unit operably connected to the roller tube and comprising:
a motor adapted to create torque to rotate the roller tube to lower or raise the shade material;
a force sensor positioned at a point along the motor drive unit that resists the torque created by the motor resulting in a reaction force that is detected by the force sensor; and
a motor control module electrically connected to the motor and the force sensor, wherein the motor control module is adapted to receive sensor readings from the force sensor, and wherein the motor control module is adapted to control the motor in response to determining that the shade material has been pulled when the motor control module detects that there is an abrupt increase in the reaction force using the received sensor readings.

24. A motorized shade for covering an architectural opening comprising:
a roller tube;
a shade material comprising and extending between a first end connected to the roller tube and a second end;
a hem bar connected to the second end of the shade material; and
a motor drive unit operably connected to the roller tube and comprising:
a motor adapted to create torque to rotate the roller tube to lower or raise the shade material;
a force sensor positioned at a point along the motor drive unit that resists the torque created by the motor resulting in a reaction force that is detected by the force sensor; and
a motor control module electrically connected to the motor and the force sensor, wherein the motor control module is adapted to receive sensor readings from the force sensor, and wherein the motor control module is adapted to control the motor in response to determining that the hem bar has encountered an obstacle when the motor control module detects that there is an abrupt release in the reaction force using the received sensor readings.

* * * * *